United States Patent

Bäcker et al.

[11] 4,076,908
[45] Feb. 28, 1978

[54] POLE BOLT SEAL FOR STORAGE BATTERIES

[75] Inventors: Karl-Heinrich Bäcker, Eneppetal; Hermann Schlachta, Hagen, both of Germany

[73] Assignee: Varta Batterie Aktiengesellschaft, Germany

[21] Appl. No.: 703,542

[22] Filed: Jul. 8, 1976

[30] Foreign Application Priority Data

Aug. 12, 1975 Germany .............................. 2535871

[51] Int. Cl.² ............................................. H01M 2/06
[52] U.S. Cl. .................................... 429/184; 29/623.2
[58] Field of Search ................ 429/181, 178, 183, 184

[56] References Cited

U.S. PATENT DOCUMENTS

| 1,371,092 | 3/1921 | Holland et al. | 429/183 |
| 1,379,854 | 5/1921 | Dinin | 429/184 |
| 1,545,695 | 7/1925 | Puckett | 429/184 |
| 3,652,340 | 3/1972 | Sharpe et al. | 429/184 |

Primary Examiner—Donald L. Walton
Attorney, Agent, or Firm—Weiser, Stapler & Spivak

[57] ABSTRACT

The pole bolt protruding through the cover aperture is surrounded by a section of shrink tubing. Adhesive is provided between bolt and tubing. A cap is placed over the bolt resting on the upper edge of the aperture, and a cast body fills the space between cap and shrink tubing.

6 Claims, 1 Drawing Figure

U.S. Patent  Feb. 28, 1978  4,076,908
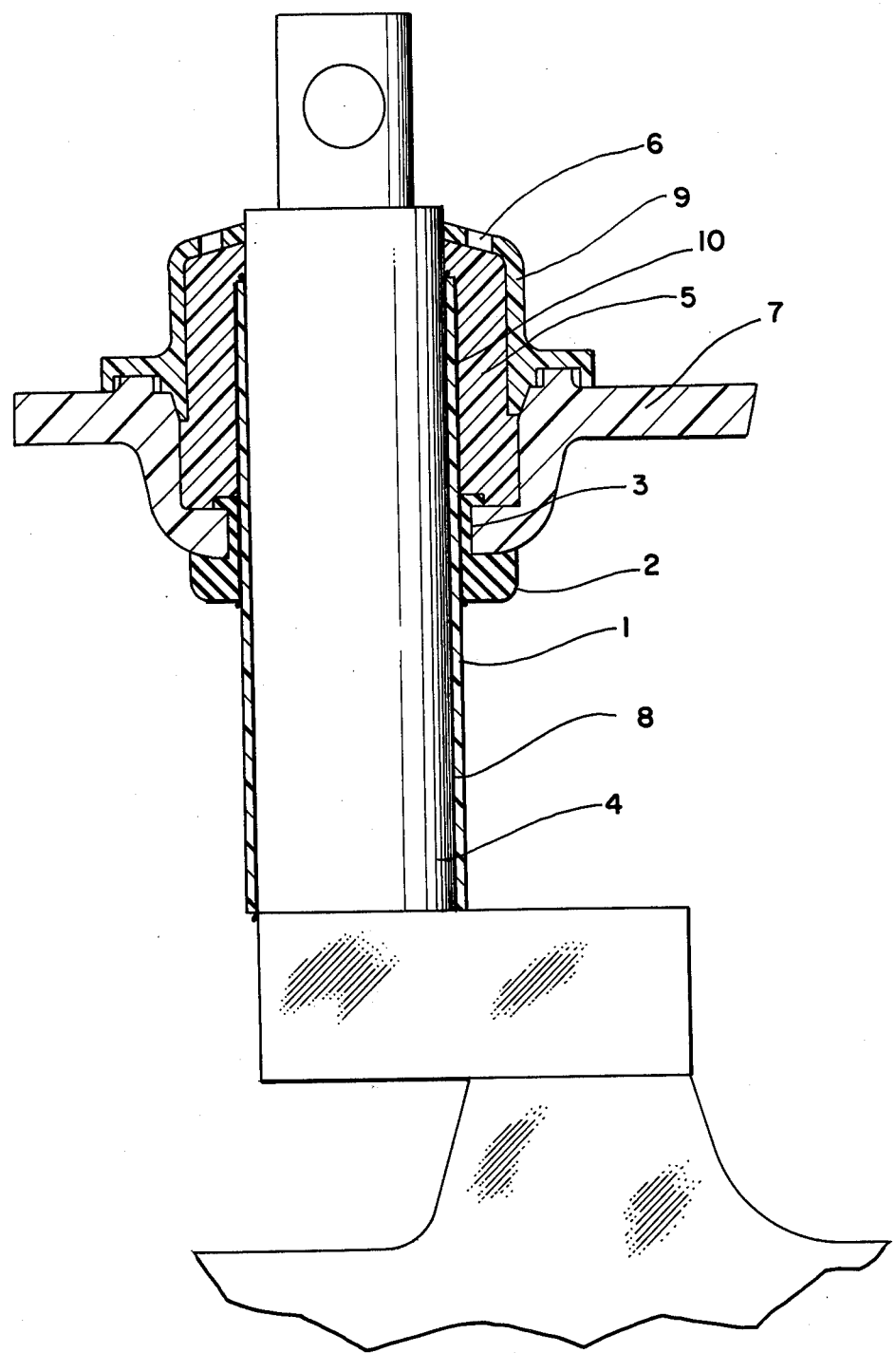

POLE BOLT SEAL FOR STORAGE BATTERIES

The invention relates to electric storage batteries and particularly to lead storage batteries having pole bolts protruding through the cover.

Lead storage batteries, particularly for fixed station and vehicle use, generally have a case of synthetic plastic and a cover also of thermoplastic synthetic material which is welded to the case. The lead terminals protrude through the cover and are connected with the pole bridges inside the cell.

Terminal lead-throughs are known in a wide variety of forms. For example, it is known to provide vertical and transverse holes in the lead terminal and to fill these with a plastic material of synthetic plastic, so that the lower half of the terminal, in the gap between the pole bolt shaft and the wall of the cover aperture, is surrounded by extruded synthetic material.

Particularly in comparatively large storage batteries, the pole bolts are, in most cases, brought out through the cell cover via rubber seals. The lead-through area is sealed off by greater or lesser tightening of a cover nut which compresses the sealing rings. The seal itself then becomes independent of the flow characteristics of the material constituting the sealing rings. Due to the high seepage ability of the electrolyte, reliable sealing cannot be maintained, especially over long storage periods.

In other variants, the cover nut is provided with a fluting of swallowtail shape on its sealing side, so that the sealing material is also subjected to diagonal forces. Such seals are initially effective. However, since the sealing material is heavily stressed by the point loading, they quickly loosen. Such sealing arrangements must therefore be constantly tested and readjusted. It also is known to lead the pole bolt out through the cover aperture and to position between cover aperture and the outer wall of the pole bolt a sealing ring which consists of soft rubber. An insert is then cast into the recess formed by the cover aperture, which consists of bitumen or of a synthetic plastic. Since heat expansion during battery operation and pressure or shock acting upon the storage battery cause the shaft of the pole bolt to be in constant movement, such arrangements are also not capable of providing a trouble-free seal.

Accordingly, it is an object of the invention to provide a sealing arrangement, particularly for lead storage batteries, which retains sufficient tightness especially after long periods of usage and which also protects the pole bolt against corrosion.

These and other objects which will appear are achieved in accordance with the invention by shrinking onto the shaft of the pole bolt a section of shrink tubing, by sliding a cap onto the top edge of the cover aperture over the shaft of the pole bolt, and by filling the space between the inner wall of the cap and the pole bolt shaft with its shrink tubing section with a casting material.

For further details, reference is made to the discussion which follows, in the light of the accompanying drawing which shows an elevation, partly in cross-section, of an embodiment of the invention.

In the drawing, pole bolt shaft 4 is provided with the shrink tubing section 1 according to the invention before cover 7 is applied. In preparation for this, pole bolt shaft 4 is treated to remove lead oxides. This may be accomplished by sanding the entire length of this pole bolt shaft with a mixture of very fine sand and water, to remove the casting skin. The subsequent processing should be preformed as quickly as practical thereafter, to avoid the formation of oxides. The pole bolt shaft is then coated with sealing material 8. Alternately, a separate process is used to pre-coat the inside of shrink tubing section 1 with the sealing material before being applied to shaft 4. The pole bolt 4 is then raised to an appropriate temperature and shrink tubing section 1, coated on its inside with an adhesive or sealing material 8, is slipped over pole bolt shaft 4 and uniformly shrunk so that it adheres evenly while the sealing material 8, which is preferably a hot melt adhesive, visibly emerges from its ends. To this end, shrink tubing 1 is shrunk by conventional techniques, e.g., by use of a hot air blower or an infrared radiator. For this purpose the temperature of the pole bolt is desirably raised to the range of about 120° to 140° C, about 110° C being the lower limit. After cooling has taken place, lid 7 is applied. Pole bolt shaft 4 then protrudes through sealing ring 2 in cover 7 having cover aperture 3.

The shrink tubing then has a bonding agent 10 brushed onto it. This agent may be of any suitable, conventional type, preferably dissolved in a solvent such as toluol or polyisobutylene. Thereafter, a cap 9, preferably of synthetic material, is so slipped over pole bolt shaft 4 that its lower portion rests tightly upon the upper edge of cell cover 7. Thereafter a casting material 5 is introduced into the hollow between the inner wall of synthetic cap 9 and the outer wall of shrink tubing section 1 through an opening 6 provided in the cap. The casting material 5 is desirably a thixotropic mass, preferably a self-hardening two-component polyurethane casting material. The shrink tubing section may consist of modified wetted polyolefin and cap 9 of polystyrol.

The particular advantage of an arrangement in accordance with the invention lies in that the sealant-coated shrink tubing seals off the microscopic channels, pores, etc. which are always unavoidably present on the surface of the lead (especially pure lead) along the entire length of the pole shaft so that the critical sealing zone lies within the electrolyte (sulfuric acid). In this way, the terminal is protected from the corrosive oxygen-acid mixture. The sealing itself is provided by the sealing ring positioned in the cover in cooperation with the casting enclosed by the cap. By applying bonding agent to the outside of the shrink tubing, especially good adhesion of the casting to the shrink tubing is achieved. Such good adhesion is necessary because it is this casting which anchors the plate stack against small vertical shocks.

We claim:

1. In a lead storage battery having pole bolts protruding through apertures in the battery cover, the improvement comprising;
    a section of shrink tubing shrunk onto the pole bolt shaft,
    a hollow cap slipped over the shaft and having its bottom edge resting on the upper edge of the cover aperture,
    a cast body filling the space between the inner wall of the cap and the shrink tubing, and
    a sealing ring between the shrink tubing and the inner edge of the cover aperture.

2. The battery of claim 1 further comprising an adhesive between pole bolt shaft and shrink tubing.

3. The battery of claim 2 wherein the adhesive is a hot melt adhesive.

4. The battery of claim 1 wherein the outside of the shrink tubing is coated with a bonding agent.

5. The battery of claim 1 having a pole bridge and wherein the shrink tubing section extends all the way down to the pole bridge.

6. The battery of claim 2 whose method of manufacture includes the steps of
   removing oxide from the pole bolt shafts,
   heating the shafts,
   applying the adhesive and the shrink tubing to the shafts, and
   shrinking the tubing until adhesive is extruded at the ends of the shrink tubing.

* * * * *